United States Patent [19]

West et al.

[11] Patent Number: 5,422,494
[45] Date of Patent: Jun. 6, 1995

[54] BARRIER TRANSMISSION APPARATUS

[75] Inventors: Thomas L. West, Medina; James A. Staron, Cleveland, both of Ohio

[73] Assignee: The Scott Fetzer Company, Westlake, Ohio

[21] Appl. No.: 182,805

[22] Filed: Jan. 14, 1994

Related U.S. Application Data

[63] Continuation-in-part of Ser. No. 962,128, Oct. 16, 1992, abandoned.

[51] Int. Cl.⁶ .............................................. G02B 27/00
[52] U.S. Cl. ................... 250/551; 250/227.24
[58] Field of Search ............ 250/551, 227.11, 227.24, 250/227.28, 239; 385/53, 92, 94

[56] References Cited

U.S. PATENT DOCUMENTS

| | | |
|---|---|---|
| 3,016,421 | 1/1962 | Harmon . |
| 3,372,789 | 3/1968 | Thiele et al. . |
| 3,673,327 | 6/1972 | Johnson et al. . |
| 3,827,787 | 8/1974 | Ripart . |
| 3,940,609 | 2/1976 | Johnston . |
| 4,222,629 | 9/1980 | Dassele et al. ................. 250/227.24 |
| 4,267,443 | 5/1981 | Carroll et al. . |
| 4,360,249 | 11/1982 | Siemon . |
| 4,406,514 | 9/1983 | Hillegonds et al. . |
| 4,470,662 | 9/1984 | Mumzhiu . |
| 4,539,475 | 9/1985 | Bosse . |
| 4,544,242 | 10/1985 | Schindl . |
| 4,621,257 | 11/1986 | Brown . |
| 4,767,173 | 8/1988 | Priaroggia . |
| 4,818,859 | 4/1989 | Hough . |
| 4,880,969 | 11/1989 | Laurie . |
| 4,951,035 | 8/1990 | Beiswenger . |

*Primary Examiner*—David C. Nelms
*Attorney, Agent, or Firm*—Watts, Hoffmann, Fisher & Heinke Co.

[57] ABSTRACT

In one embodiment, a touch input device has a flame and explosion resistant enclosure supporting a display device which is observable from outside the enclosure. The touch screen input device comprises a frame attachable to an axial end of the housing. A transparent window is receivable in the frame for securement to the housing to form an end of the enclosure and defining a view port for viewing the display device. An interface between the window and the frame defines a flame suppressing path extending continuously about the periphery of the interface. A light emitting device is located within the enclosure for directing a beam of light through the window. A first reflector is located on a side of the window opposite the light emitting device for reflecting the beam of light across the view port. A second reflector is located on the same side of the window as the first reflector and spaced from the first reflector to reflect the beam of light from the first reflector through the window and into the enclosure. A light receiving device is located within the enclosure on the same side of the window as the light emitting device. The light receiving device for detecting the presence of the beam of light or the absence of the beam of light. In another embodiment, an apparatus for transmitting a signal through a barrier of a sealed enclosure is disclosed. The apparatus comprises a body having a length greater than the thickness of the barrier and an opening extending therethrough. Attachment structure fixes the body in an opening extending through the barrier. A light transmissive member is fit in the opening of the body to inhibit flame propagation between the body and the light transmissive member. Retention structure retains the light transmissive member in the opening in the body and connects a pair of fiber optic members to ends of the body in light transmitting communication with the light transmissive member.

11 Claims, 9 Drawing Sheets

BARRIER TRANSMISSION APPARATUS

This is a continuation-in-part of application Ser. No. 07/962,128 filed on Oct. 16, 1992 now abandoned.

TECHNICAL FIELD

The present invention relates generally to an apparatus and method for interacting with a computer terminal and other instrumentation, and in particular to a touchscreen-type data input apparatus and to a signal transmission apparatus.

BACKGROUND ART

Touchscreen interfaces which enable a user to interact with a computer display, terminal, etc. are found in many applications. In a touchscreen-type apparatus, the user touches areas of a video screen with his or her finger in order to activate control functions displayed on the video screen, to select a menu item from list of items displayed on the video screen, etc. In one type of touchscreen technology, the location on the video screen contacted by the user is detected using an array of emitters and associated detectors positioned along the perimeter of the video screen. In most, if not all applications, the video screen perimeter is square or rectangular. Emitters are positioned along one vertical and one horizontal side of the perimeter, and the corresponding detectors are positioned on the opposite vertical and horizontal sides across from and in alignment with an associated emitter. With this arrangement, the touchscreen is divided into multiple touch zones, the number of zones being determined by the number of emitter/detectorpairs. For example, if four vertical emitter/detectorpairs and four horizontal emitter/detectorpairs are used, the video screen is divided into a matrix of 16 zones. The position touched by a user is determined by which horizontal and vertical beam paths are blocked by the user's finger.

In explosive environments, data display terminals and/or instrumentation must be contained within explosion-proof housings. Data entry devices enabling an operator to interact with instrumentation, data terminals, etc. that are located in an explosion-proof environment are not readily available, and what is available can be extremely costly. In many hazardous environments, interacting with process instrumentation and controls is done in a secured control room environment that is sealed and isolated from the process environment. In order to interact with or access process instrumentation and controls, the operator must leave the process environment and enter the isolated control room.

It has been found desirable for some applications to be able to access and interact with terminals and other instrumentation located in the process environment. For example, being able to interact with a display terminal on the process floor in order to display process parameters and/otto change process parameters would enable an operator to more quickly modify process conditions because it would obviate the need for leaving the processing environment to enter a separate control room. Apparatus enabling an operator to directly interact with instrumentation contained within an explosion-proof housing, is not readily available, and what is available is considered to be prohibitively expensive for many applications.

It is also desirable in some applications to be able to transmit a signal across a barrier which at least partially defines an explosion-proof room or enclosure. In this type of signal transmission it is not necessary that an operator be able to interact with the signal. However, it is very important that signal quality and integrity be maintained during the transmission.

DISCLOSURE OF THE INVENTION

The present invention provides a new and improved touch input device that is especially adapted for use in an explosive environment or other environments where it is desirable to isolate electronic components from the surroundings. According to the preferred and illustrated embodiment, the invention includes an enclosure that defines a view port including a window defined in part by a touch detecting region located adjacent an outside surface of the window. A display, such as a cathode ray tube (CRT) liquid crystal display (LCD), etc. is viewable in the view port by an operator.

In one embodiment, the touch input device comprises a frame attachable to an axial end of a housing. A transparent window is receivable in the frame for securement to the housing. The frame and window define a view port for viewing the display device through. An interface between the window and the frame defines a flame suppressing path extending continuously about the periphery of the interface. The flame suppressing path has a length taken in a plane extending normal to a surface of the frame defining the view port. A light emitting device is located within the enclosure for directing a beam of light outwardly through the window. A first reflector is located on a side of the window opposite the light emitting device for reflecting the beam of light across the view port. A second reflector is located on the same side of the window as the first reflector and is spaced therefrom to reflect the beam of light from the first reflector through the window and back into the enclosure. A light receiving device is located within the enclosure on the same side of the window as the light emitting device. The light receiving device detects the presence of the beam of light or the absence of the beam of light reflected from the second reflector.

Each of the first and second reflectors comprises a prism located between the window and the frame. Each prism has a surface adapted to be inclined at an acute angle relative to a plane defining a surface of the window. The light emitting device includes a plurality of emitters arranged in a linear array. Each emitter is supported so a series of spaced apart and parallel beams of light are directed through the window towards the first reflector. The light receiving device includes a plurality of photoreceptors arranged in a linear array. Each of the plurality of photoreceptors receives a respective one of the beams of light reflected from the second reflector.

Each of the plurality of emitters and detectors includes a lens for focusing a beam of light, a fiber optic cable having one end supported adjacent a respective lens for light communication therebetween and the other end of the fiber optic cable being coupled to a respective one of an emitter and a photoreceptor. The flame suppressing path in the illustrated embodiment extends for at least 1.5 inches.

In another embodiment of the invention an apparatus transmits a light signal through a barrier which at least partially defines an enclosed and explosion resistant room. The apparatus comprises a body with an opening extending therethrough. Attachment structure fixes the body in an opening in the barrier and maintains the explosion proof characteristics of the barrier. A light transmissive member is closely fit in the opening of the body to inhibit flame propagation on one side of the barrier from reaching the other side of the barrier through a flame suppressing path clearance between the body and the light transmissive member. Retention structure retains the light transmissive member in the opening in the body. The retention structure connects a pair of fiber optic members to ends of the body for light transmitting communication with ends of the light transmissive member.

A flame suppression path between the light transmissive member and the body in the illustrated embodiment extends for a length of at least 1.5 inches taken in a direction along the extent of the body. The attachment structure includes an external thread formed on an end portion of the body and an internally threaded member for threaded engagement with the external thread on the body. The retention structure includes an internal thread formed in an end portion of the body and an externally threaded lens stop member for threaded engagement with the internal thread in the body. The lens stop member has an internally threaded portion for threaded connection with a threaded connector end of the fiber optic member.

The light transmissive member is a glass rod. A light transmitting coupler sphere is located between the light transmissive member and the fiber optic member to enable light communication between different sizes of the light transmissive member and the fiber optic member. The coupling sphere is located in the retention structure. A first annular elastomeric member is located between the coupling sphere and a shoulder of the retention structure. A second annular elastomeric member is located between the retention structure and the light transmissive member.

Additional features of the invention will become apparent and a fuller understanding obtained by reading the following detailed description made in connection with the accompanying drawings.

BEST MODE FOR CARRYING OUT THE INVENTION

Figure 1:
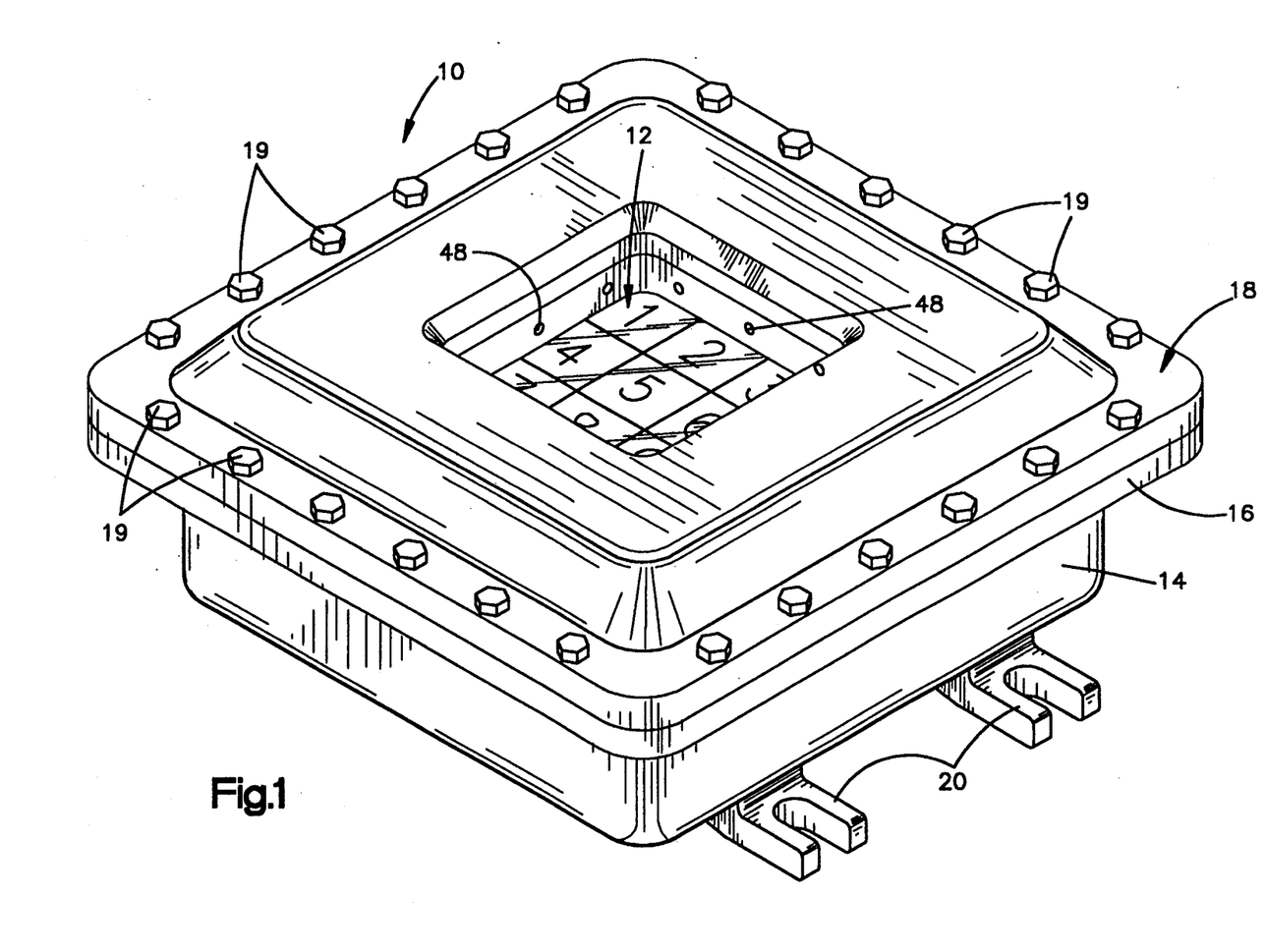
FIG. 1 is a perspective view of an explosion-proof enclosure containing a video display terminal constructed in accordance with a preferred embodiment of the invention.
Figure 2:
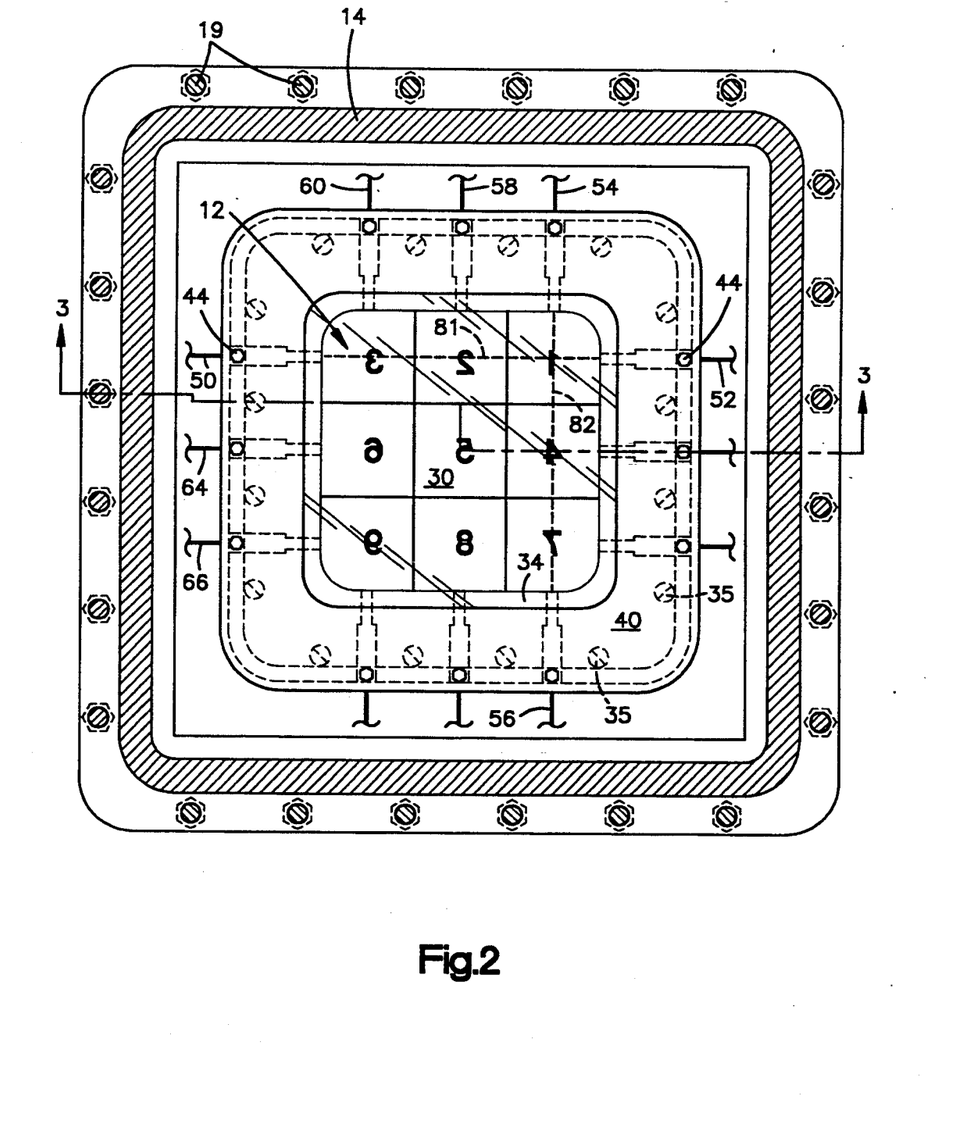
FIG. 2 is a sectional view of the enclosure as seen from the plane indicated by line 2—2 in FIG. 3.
Figure 3:
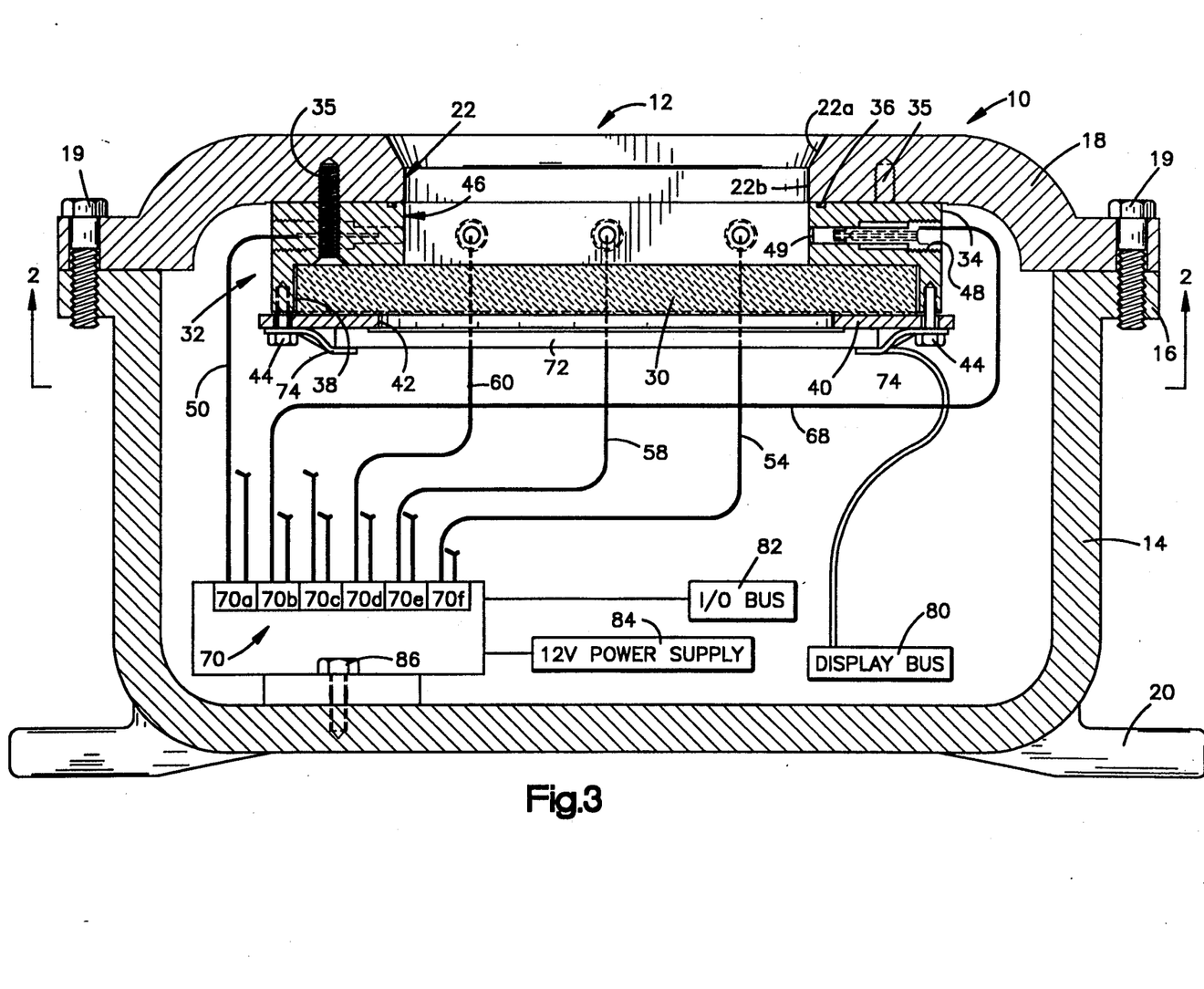
FIG. 3 is a sectional view of the enclosure as seen from the plane indicated by line 3—3 in FIG. 2 with interior components shown schematically.

FIG. 1 illustrates the overall construction of an explosion-proof enclosure 10 constructed in accordance with the preferred embodiment of the invention. In the preferred embodiment, the enclosure 10 is intended to enclose a video display terminal, the video screen being visible through a view port indicated generally by the reference character 12. Referring also to FIGS. 2 and 3, the enclosure 10 includes a housing member 14 in which the electronic components are mounted, including a peripheral flange 16 to which a mating, cover plate 18 is rigidly bolted by a plurality of bolts 19. The housing 14 and cover plate 18, as is known, may be made from cast aluminum or other suitable materials.

The housing 14 in the illustrated embodiment includes integrally cast mounting lugs 20 by which the enclosure is mounted to a wall, frame member, etc. Conduits (not shown) extending from the housing 12 interconnect the instrumentation contained within the housing to other instrumentation or other process control equipment, such as a central process control computer (not shown).

As is known, instrumentation electronics used in explosive environments must be enclosed in such a way that a spark occurring within the enclosure is contained and extinguished within the enclosure and does not produce a flame that leaks from the housing into the outside environment.

As seen best in FIG. 3, the view port 12 is defined by a central opening 22 formed in the cover. In the exemplary embodiment, the central opening includes an outer, outwardly tapered portion 22a which merges with an opening portion defined by orthogonal walls 22b.

The interior of the housing 14 is isolated from the opening 22 by a glass view plate 30 which is carried by a frame assembly indicated generally by the reference character 32.

As seen best in FIG. 3, the frame assembly 32 includes a perimeter member 34 bolted directly to the rear of the front cover plate by a plurality bolts 35. An O-ring seal 36 seals the interface between the back of the front cover plate 18 and the perimeter member 34. The glass view plate 30 is held in a recess 38 formed in the frame member by a retaining plate 40. The retaining plate 40 includes a central opening 42 aligned with, and in the illustrated embodiment, larger than, the opening 22 formed in the cover plate 18, and clamps the glass view plate 30 against the base of the recess 38. A plurality of bolts 44 hold the retaining plate 40 to the frame member 34.

A square, central opening 46 formed in the frame member 34, which is aligned with the opening 22 in the cover plate 18 defines a touch detecting region. In particular, a sensing arrangement (to be described) detects locations on the glass view plate 30 touched by an operator. To achieve this feature, an array of fiber optic "emitters" and "sensors" are spaced around the inside perimeter of the frame member opening 46. An "emitter" fiber optic cable transmits light from a conventional emitter located within the housing 14 to the inside perimeter of the frame member opening 46. The ends of the fiber optic cables are captured within threaded, multi-diameter throughbores 48 formed in the frame member 34. The bores 48 extend through the frame member 34. Details of the bore construction will be described below.

A lens 49 at the end of the fiber optic cable forms a beam of light aimed at the end of a "detector" fiber optic cable located on the opposite side of the view port and directly across and aligned with the "emitter" fiber optic cable. Referring to FIG. 2, as an example, fiber optic cable 50 forms the "emitter" of the "emitter/detector" pair and emits a light beam aimed and aligned with the "detector" fiber optic cable 52 located on the opposite side of the view port. Similarly, a fiber optic cable 54 defines the "emitter" and conveys light from a conventional emitter located within the housing to the inner perimeter of the view port. A beam of light is formed which is transmitted across the view port to the "detector" fiber optic 56. The use of three horizontal and three vertical fiber optic emitter/detectorpairs defines a grid which divides the view port into nine zones. For purposes of explanation, digits 1-9 are shown within the view port. It should be understood that the video screen located within the enclosure and aligned with the view port may be display digits, icons, text, legends, etc., depending on the application. In any event, the six emitter/detectorpairs define nine separate detectable zones. If the operator, as an example, touches zone 1 of the view port, the beams B1, B2 (see FIG. 2) emitted by fiber optic cables 50, 54 are blocked. The absence of light detected by the associated fiber optic detectors 52, 56 is processed by the instrumentation contained within the enclosure (or alternately by equipment connected to the enclosure) by which it is determined that zone 1 has been touched by the operator. Depending on the application, the detection of the touch by the operator may invoke a control function, change the display, signal the process computer that action needs to taken, etc. In general, system control software will be programmed to effect an action when a particular zone in the view port is touched by an operator.

According to a feature of the invention, emitter and detector elements are alternated along a given side of the view port. For example, fiber optic element 54 as indicated above, is an "emitter," adjacent fiber optic element 58 is arranged as a "detector," and fiber optic element 60 is formed as an "emitter." The elements are similarly arranged along the vertical sides of the view port. For example, fiber optic element 64 is a detector, whereas fiber optic elements 66, 68 are emitters. By alternating emitters and detectors, the elements may be more closely spaced.

According to another feature of the invention, the number of emitter/detectorpairs can be changed for a given enclosure without necessitating substantial modifications to the enclosure itself. This feature is made possible by the frame assembly 34. If eight emitter/detectorpairs are desired for a given application (as opposed to the six emitter/detectorpairs illustrated in FIG. 3), the frame assembly shown in FIG. 3 is simply replaced with one that includes four through bores in each wall of the frame member opening 46. With this feature, the housing 14 and cover plate 18 need not be modified at all to accept a touchscreen having 16 detectable zones (as opposed to nine detectable zones). With the disclosed arrangement, an enclosure can be changed from a "9-zone" touchscreen to a "16-zone" touchscreen in the field. This enables the hardware to be readily upgraded when a software upgrade is implemented which changes the information or zones defined on the video screen itself. With the disclosed invention, in many applications, the display electronics, housing and cover plate remained unchanged as a result of an upgrade. Only the emitter/detectorframe 34 and the electronics associated with the fiber optic elements needs to be replaced.

Returning to FIG. 3, the electronics for processing signals from the emitter/detectors is schematically illustrated. Each fiber optic cable that forms a emitter/detectorpair is connected to a module 70. The module includes a light emitting element and a light detecting element that are coupled to the ends of the respective fiber optic cables. For example, fiber optic cable 50, which forms an emitter, is coupled to a light emitting element located within its associated module 70a. Similarly, fiber optic emitter cable 54 is connected to module 70f, fiber optic cable detector 58 is connected to module 70e, emitter fiber optic cable 60 is connected to module 70d and emitter fiber optic cable 68 is connected to module 70b. Suitable modules 70 for processing signals conveyed by the emitter/detectorfiber optic cables are available from Opcon of Evert, Wash. under part no. 15100A6517.

In the illustrated embodiment, a relatively flat display panel 72 is depicted. This panel may comprise a CRT or LCD panel. In the illustrated configuration, the panel 72 is shown as an LCD panel and is held to the frame member by retaining clamps 74 which are also held by the bolts 44 which secure the clamping plate 40. The LCD panel is connected to a conventional display bus 80 which may be connected to an internal CPU mounted within the housing 14 or to a remote CPU. In addition, the modules 70a–70f may also be connected to a conventional input/output bus 82 forming part of the overall computer system. A 12 volt power supply 84 which may be internal to the housing 14 provides power to the fiber optic sensor modules 70 and other support circuitry (not shown). The modules 70a–70f may form part of an overall circuit module mounted to the housing 14 by a bolt 86.

Figure 4:
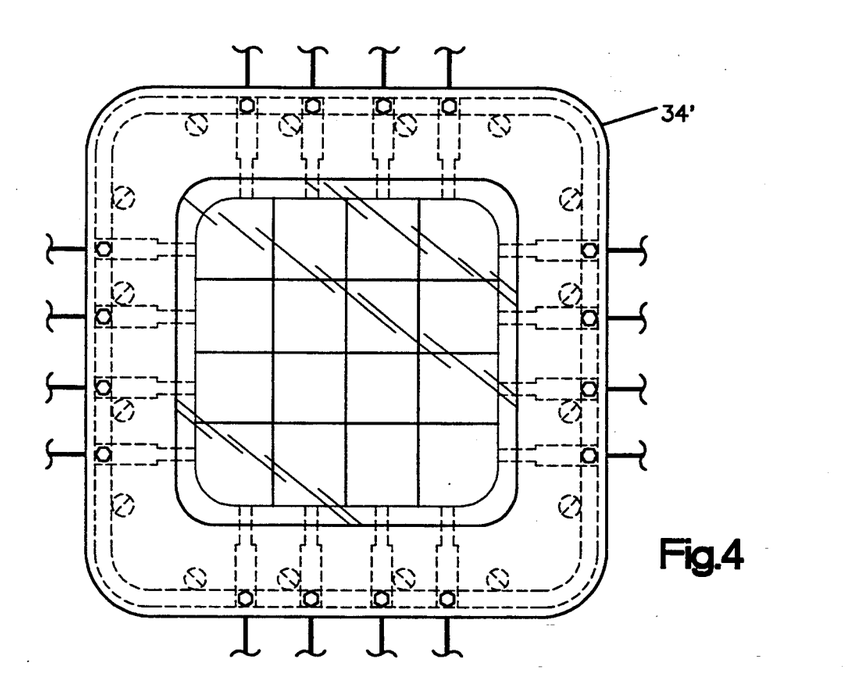
FIG. 4 is an exploded view of a frame assembly that mounts eight emitter/detector pairs.
Figure 5:
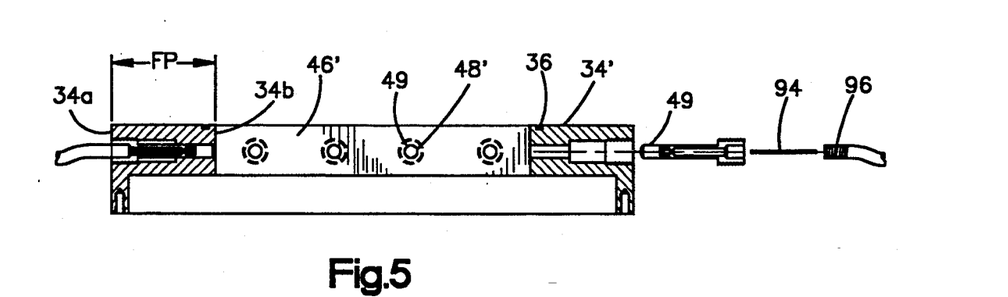
FIG. 5 is a sectional view of the frame shown in FIG. 4.
Figure 6:
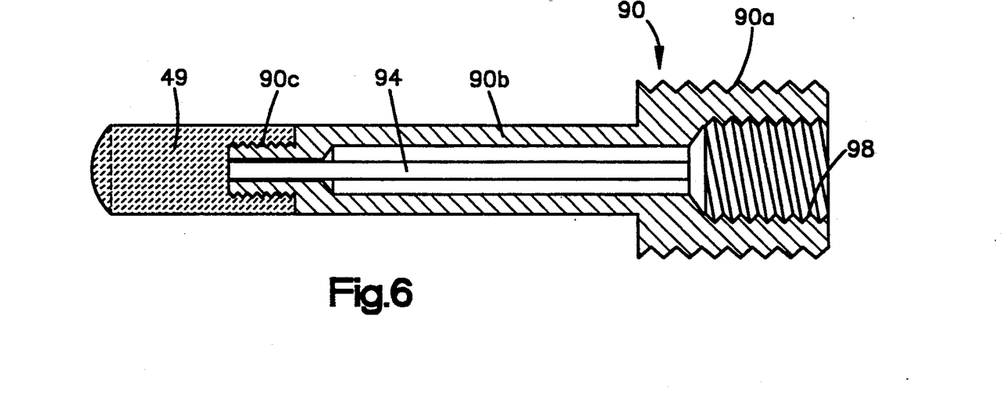
FIG. 6 is a fragmentary, sectional view of a mounting assembly that mounts the components of an emitter element to the frame shown in FIGS. 4 and 5.

As indicated above, the frame assembly 34 may be replaced with alternate configurations to provide a different number of touch zones in the view port. FIGS. 4, 5 and 6 illustrate a frame assembly 34' which mounts eight pairs of emitter/detectors to provide 16 touch detectable zones. Except for the number of emitter/detectorelements, the construction of the frame assembly 34' is substantially identical to the assembly 34 shown in FIG. 2 and may be mounted to the cover plate 18 of the enclosure 10.

FIG. 5 illustrates a more preferred mounting for the emitter/detectors in the detecting region 46'. In this embodiment, the multi-diameter throughbores 48' mount a threaded ferrule 90 (best shown in FIG. 6) which includes a large diameter threaded portion 90a, a narrow uniform diameter portion 90b and a small diameter threaded portion 90c. The lens 49 is threaded onto the threaded portion 90c of the ferrule 90. The large diameter threaded portion 90a is threaded into the bore 48'. In this preferred embodiment, a light transmitting rod 94 (see FIG. 5) extends between the lens 49 and the end of a fiber optic cable 96. The rod 94 is preferably held within the ferrule by a suitable adhesive. The end 96 of the fiber optic cable is threadedly received by a threaded internal bore 98 formed in the ferrule. With the disclosed construction, a substantial flame path, FP (shown in FIG. 5), is established between an inside surface 34a and an outside surface 34b of the frame 34'. This flame path reduces a chance of flame propagation from inside the enclosure 10 to the outside by way of the emitter/detector mountings.

It has been found that suitable fiber optic cable for use as part of the emitter/detectors is available from the Mitsubishi Company under part no. ESKA SH4001. The lens 49 is available from Sunx, also of Japan, under part no. FX-LE1.

It should be noted here that in the disclosed apparatus "fiber optic" cables are utilized. It should be understood, that other light conducting conduits such as light pipes, optical fibers, etc. may be used, and are contemplated, by the present invention.

The apparatus has been illustrated with a relatively flat display panel 72 located adjacent the view plate 30. It should be understood that the invention also contemplates a construction in which the display panel may be directly adjacent the touch detecting region 46, if the application permits, eliminating the need for the separate view plate 30. The display panel 72 may comprise other forms of technology including video monitors, plasma display panels, etc.

The glass view plate 30 is "transparent" in the system described. It should be understood however that translucent or partially transparent elements constructed of materials other than glass are also contemplated by the invention. Any element used, must have sufficient light transmissivity to allow an operator to see the information displayed by the display device 72.

Figure 7:
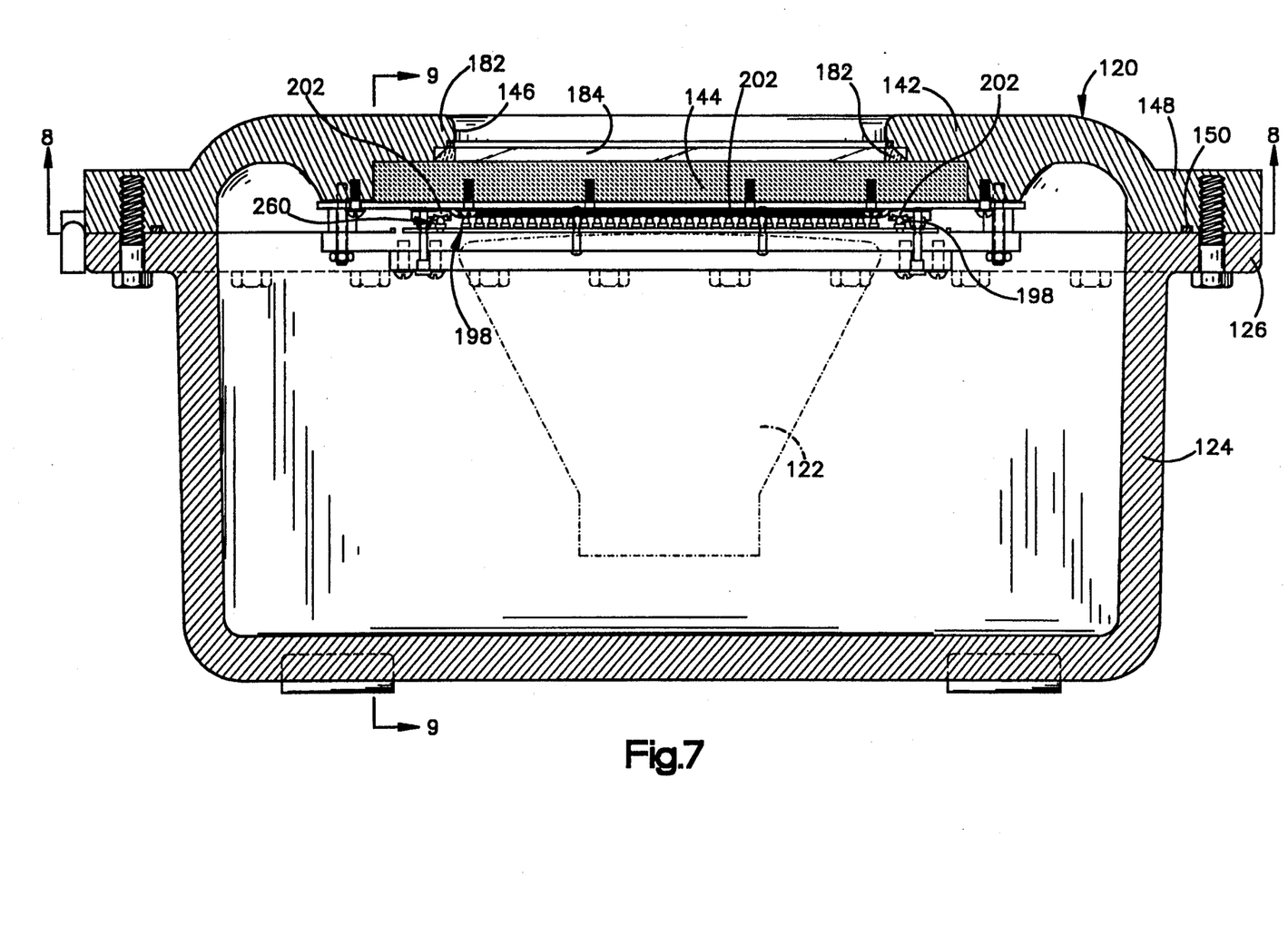
FIG. 7 is a sectional view of an enclosure according to another embodiment of the invention.
Figure 8:
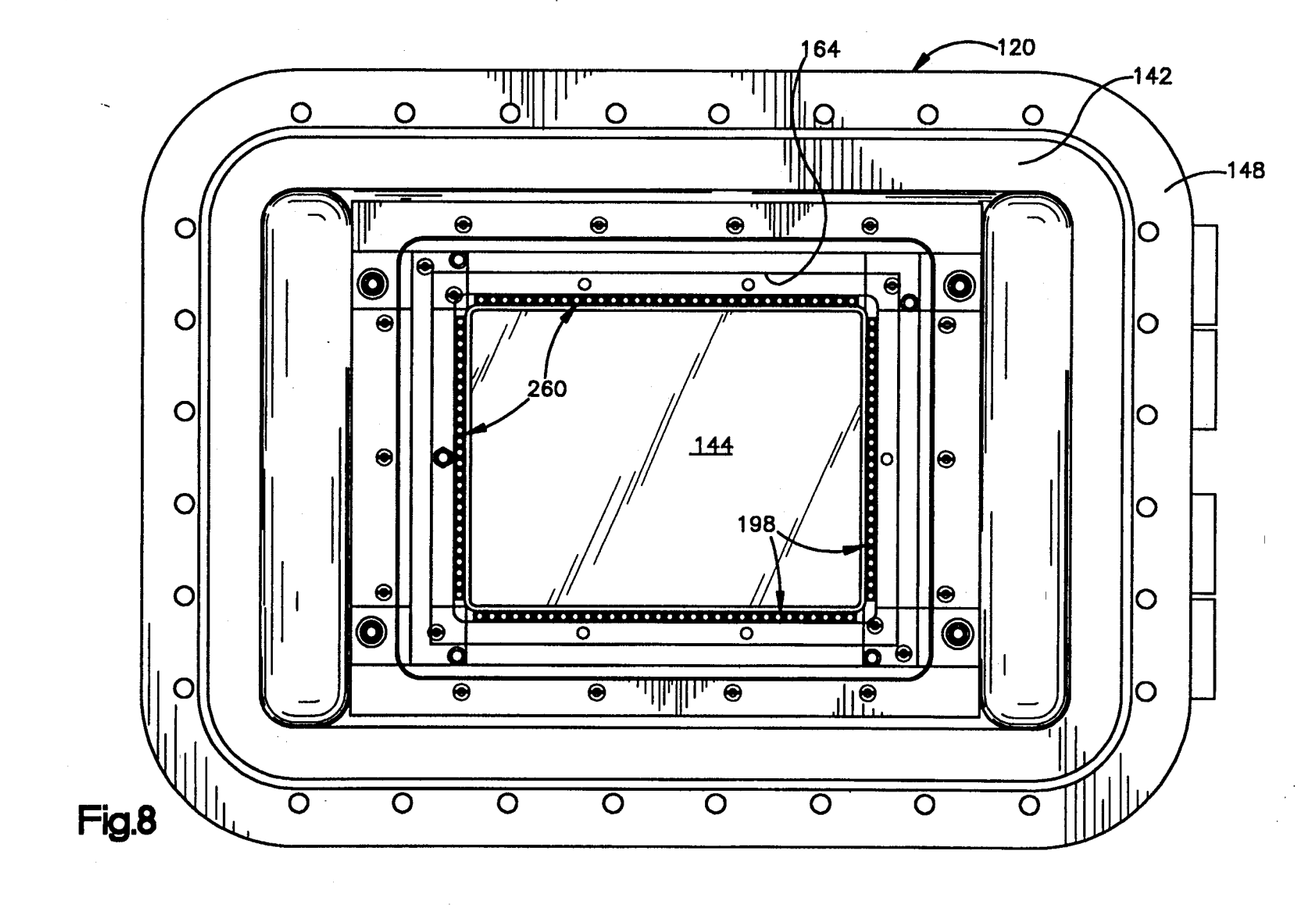
FIG. 8 is a plan view of a portion of the enclosure illustrated in FIG. 7 taken approximately along a plane indicated by line 8—8 in FIG. 7.

Another explosion-resistant enclosure 120 embodying the invention is illustrated in FIG. 7. The enclosure 120 is intended to house a video display device 122. The display device 122 and other electronic components are located within the enclosure 120. It is intended that the enclosure 120 suppresses any spark or flame emanating from the electronic components within the enclosure. Thus, the enclosure 120 is suitable for use in environments which are susceptible to explosion or which may be flammable.

The enclosure 120 includes a housing 124 for supporting the display device 122 and other electrical and electronic components. The housing 124 includes a peripheral flange 126. A frame 142 and a transparent window 144 are connected to an axial end of the housing 124 to form an axial end of the enclosure 120. The window 144 is made of a suitable thickness and width to withstand an explosion or flame according to an industry standard, such as NEC Class I, Division I, Groups B, C, D, E, F and G Hazardous Locations. Such industry standard specifies that an enclosure has a specified minimum flame path suppressing length for a given volume enclosure. The enclosure 120 of the present invention can be constructed to meet this flame path standard as a function of the volume in the enclosure. By way of example, a specific size enclosure 120 is disclosed but does not serve to limit the invention to the disclosed example.

The frame 142 has a surface 146 defining a view port or touch region of about 8.6 inches by 6.5 inches through which the display device 122 can be viewed from outside of the enclosure 120. A flange 148 on the frame 142 extends around the entire periphery of the frame and attaches the frame to the flange 126 of the housing 124. The housing 124 and the frame 142 are made from a suitable metal material, such as cast aluminum.

An O-ring 150 is located in a peripheral channel extending about the entire face of the flange 148 of the frame 142. The O-ring 150 compresses upon engagement with the flange 126 to form an environmental seal which keeps moisture and flammable material outside the enclosure 120. The length of the engaged flanges 126, 148 taken in a direction normal to the O-ring 150 is sufficient to meet industry standards for a flame path or flame propagation suppression clearance that may exist between the flanges 126, 148. Such industry standard flame suppression path length is a minimum 1.5 inches for a volume of the enclosure 120 of about 1,700 cubic inches and preferably 1,728 cubic inches.

Figure 10:
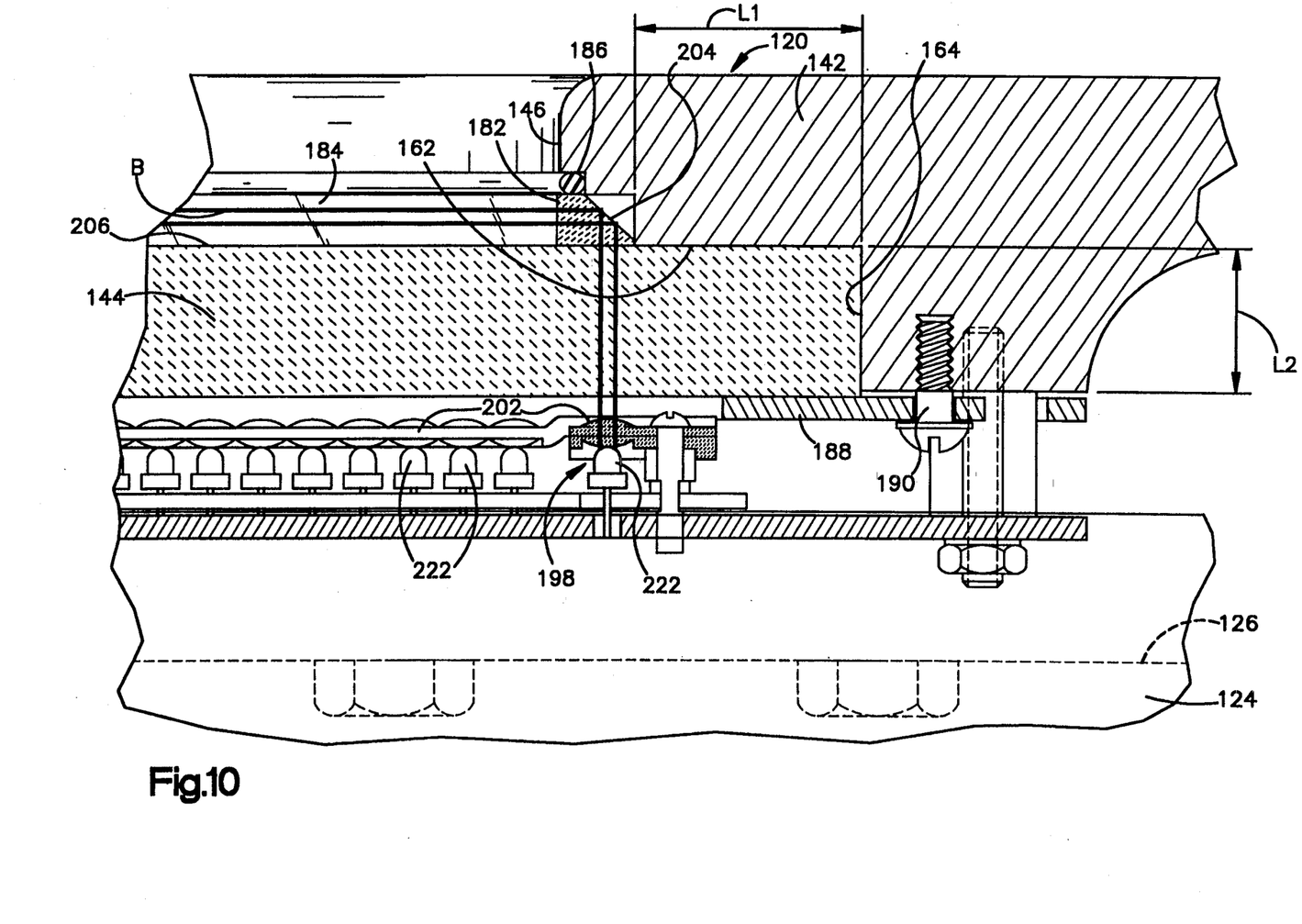
FIG. 10 is an enlarged cross-sectional view of a portion of the enclosure illustrated in FIG. 7.

The frame 142 has a machined-away portion defining a recess 162 for receiving the window 144 in a close fitting relationship. The window 144 in the recess provides a flame suppression path having a length of at least 1.5 inches for the volume of the enclosure. The flame suppression path length is determined by adding the length of the interface between the window 144 and frame 142. The interface is taken in a plane, such as that viewed in FIG. 10, which is normal to the surface 146 defining the view port.

A frontal interface length L1 (FIG. 10) is the length of engagement or close fit clearance, either of which suppresses flame propagation, between a surface 162 defining the recess of the frame 142 and the window 144. The side interface length L2 is defined as the length of engagement or close fit clearance, either of which suppresses flame propagation, between a side surface 164 of the recess in the frame 142 and the window 144. The total interface length or flame suppression path is the sum of the frontal interface length L1 plus the side interface length L2. The total interface length (L1 plus L2) is preferably at least 1.5 inches. Thus, any flame or spark occurring within the enclosure 120 is prevented from communicating outwardly of the enclosure by the flame suppression path lengths between the flanges 126, 148 and between the recess in the frame 142 and the window 144.

Prisms 182, 184 (FIGS. 7, 9 and 10), made from ISO-PLAST Thermoplastic Resin and available from Dow Plastics, are located between the window 144 and the frame 142. Each of the four prisms 182, 184 are located along a respective side of the surface 146 defining the view port. A gasket 186 is compressible and is located in a channel formed around the entire peripheral surface 146 defining the view port in the frame 142. The gasket 186 is compressible when the window 144 and prisms 182, 184 are forced in a direction upwardly, as viewed in FIG. 10, by a retainer plate 188 attaching the window to the frame 142 by screws 190.

The prisms 182, 184 are arranged in pairs. For example, a first one of the pair of prisms 182, viewed in cross-section in FIG. 7, is intended to reflect beams B (FIG. 10) of light, emitted from a light emitting device 198 from within the enclosure 120 outwardly through the window 144, across the longer dimension of the view port defined by the surface 146. When the beam B of light is reflected across the view port, it can be blocked by an operator or an object. Such blocking of the beam B of light usually is indicative of an instruction desired to be communicated to a controller.

Figure 9:
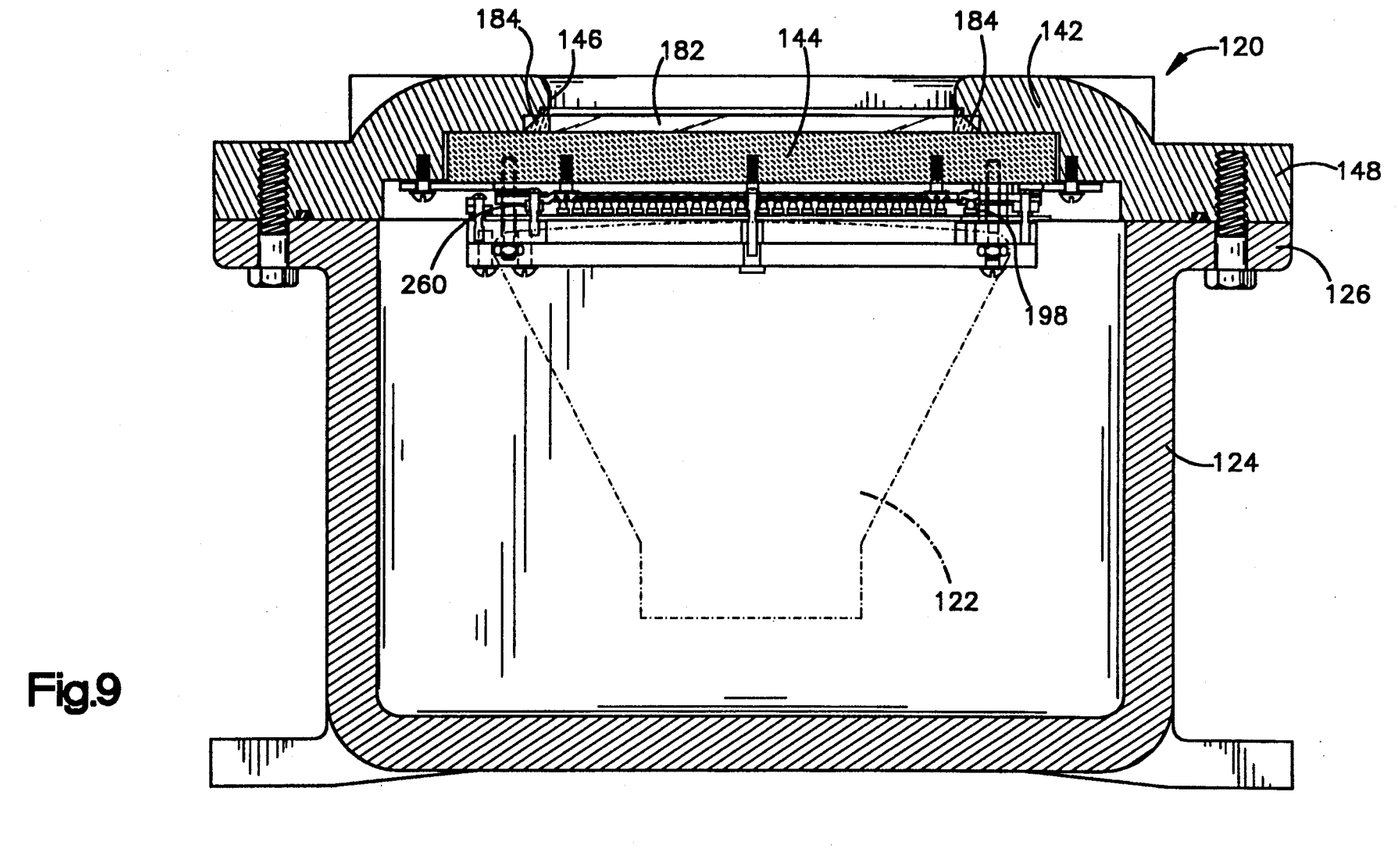
FIG. 9 is a cross-sectional view of the enclosure illustrated in FIG. 9 taken along a plane indicated by line 9—9 in FIG. 7.

The beam B of light extending across the view port is then reflected by a second one of the pair of prisms 182 at the other axial end of the view port back through the window 144 and to a light receiving device 260 located within the enclosure 120. It will be equally understood that, as illustrated in FIG. 9, a first one of the pair of prisms 184 is intended to reflect beams B of light, emitted from a light emitting device 198 within the enclosure 120 through the window 144, across the shorter dimension of the view port defined by the surface 146 to a second one of the pair of prisms 184 back through the window and to a light receiving device 260 within the enclosure.

Preferably, light is generated from within the enclosure 120 (FIG. 7) from the light emitting device 198 located within the enclosure on a first side of the window 144. The light from the light emitting device 198 is directed through a lens 202 to form a focused beam B of light. The beam B of light is transmitted through the window 144. The beam B of light (FIG. 10) is then transmitted to a first one of the prisms 182 on a second side of the window 144 opposite the side of the window that the light emitting device 198 is located. The beam B of light is reflected by a reflective surface 204 of the prism. The reflective surface 204 extends at an acute angle of about 45° relative to a substantially planar outer surface 206 of the window 144. The beam of light B is reflected by the surface 204 of the first prism 182 on the right, as viewed in FIG. 7, across the view port defined by the surface 146 in a direction substantially parallel to the planar surface 206 of the window 144. It is at this time that the beam B of light may be interrupted.

Each light emitting device 198 preferably has a plurality of individual light emitters 222 arranged in a linear array on a printed circuit board within the enclosure 120. In the preferred embodiment, the light emitting device 198 which extends in a direction parallel to the prisms 182 includes twenty-five emitters 222, each of which can be selectively actuated by circuitry on the printed circuit board to emit light. Thus, twenty-five individual beams B of light are transmitted by the light emitting device 198, through the window 144 and reflected by the first one of the pair of prisms 182 across the larger dimension of the view port defined by the surface 146. The light emitting device 198 that extends in a direction parallel to the prism 184 contains thirty-two emitters 222 to transmit light so thirty-two individual beams B of light by the first one of the pair of prisms 184 are reflected across the shorter dimension of the view port defined by the surface 146. These reflected beams B of light extending across the view port are arranged in an orthogonal eight hundred point matrix so that any of the beams being disrupted is indicative of a particular location of an object, such as an operator's finger, within the view port and relative to a particular location of the display device 122.

The second one of the cooperating pair of prisms 182, 184 on the second side of the window 144 receives an uninterrupted beam B of light extending across the view port. A reflective surface 204 of the prism 182, 184 extends at an acute angle of about 45° relative the outer surface 206 of the window 144 and reflects the beam B of light through the window and into the enclosure 120. A light receiving device 260 on the first side of the window 144 detects the absence or presence of a particular beam B of light reflected into the enclosure 120. Thus, each light receiving device 260 extending in a direction parallel to the extent of the prism 182 contains twenty-five individual photoreceptors 262 (FIG. 7). The light receiving device 260 extending in a direction parallel to the prism 184 includes thirty-two individual photoreceptors 262 (FIG. 9). A lens 202 is located between the window 146 and each light receiving device 260.

Each individual photoreceptor is sensitive to the absence or presence of light from an associated emitter 222. Thus, a controller can communicate with each photoreceptor 262 to detect where an object or objects are during any particular display sequence of the display device 122. The light emitting devices 198 and the light receiving devices 260 are available as a printed circuit board assembly from Carroll Touch, Inc. of Round Rock, Tex.

Figure 11:
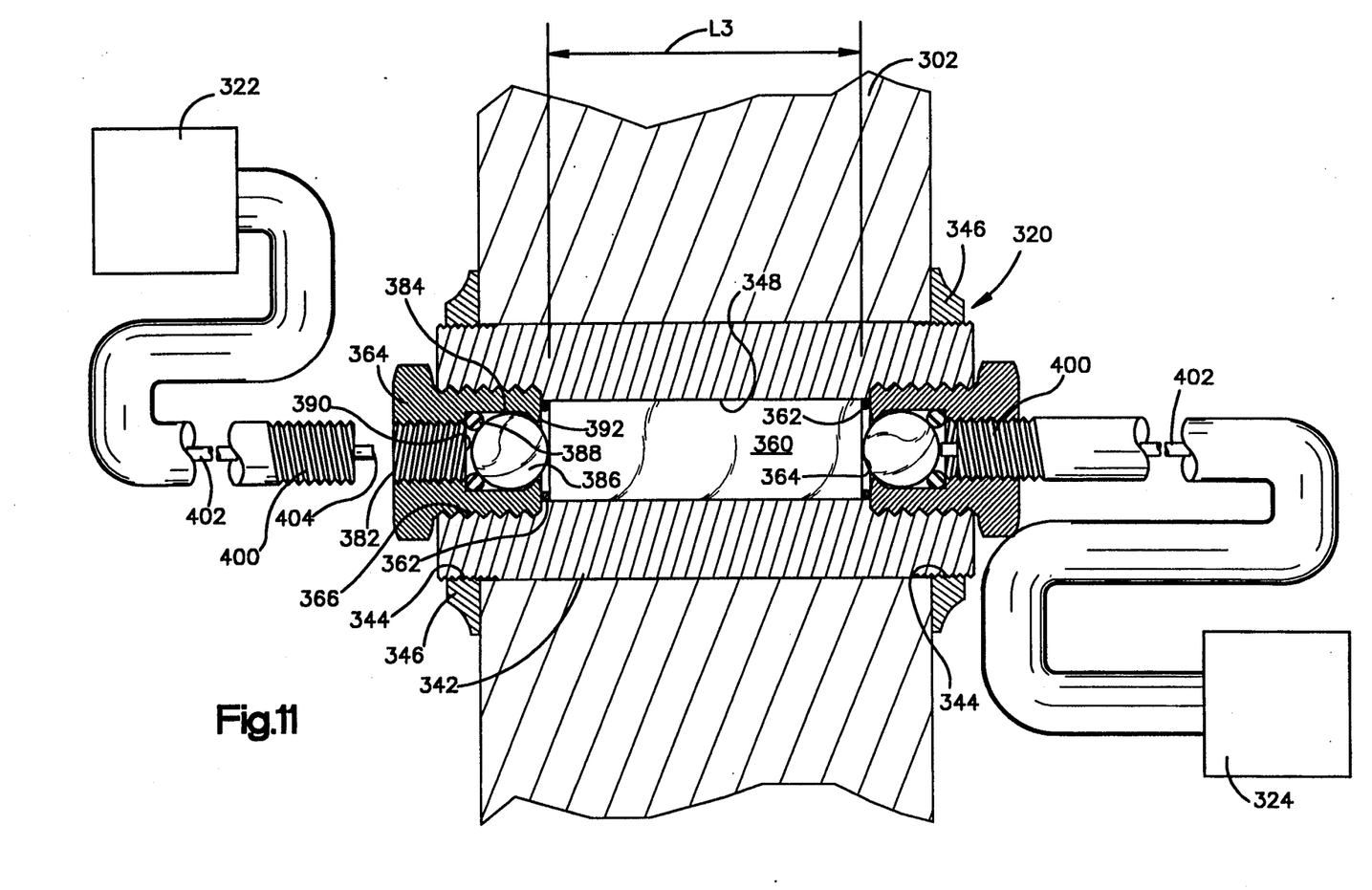
FIG. 11 is a cross-sectional view of another embodiment of the present invention illustrating signal transmission through a barrier which is explosion-resistant.

An explosion-proof barrier 302 such as an aluminum, steel or concrete wall is illustrated in FIG. 11. In another embodiment of the present invention, a signal transmitting device 320 is provided to transmit a signal from one side of the barrier 302 from a signal emitter 322 to another side of the barrier to a signal receiver 324. Such a signal transmitting device 320 is suitable for use in an environment in which a spark on one side of the barrier 302 could ignite flammable material on the other side of the barrier. For example, the signal emitting device 322 could be electrical circuitry to actuate a light emitter and the signal receiver 324 could be a photoreceptor.

In order to get the signal from the signal emitter 322 and maintain the explosion-proof characteristics of the barrier 302 to the signal receiving device 324, the signal transmitting device 320 is provided. The signal transmitting device 320 includes a tube 342 preferably made from metal with axially opposite end portions 344 having external threads. A pair of internally threaded attachment members 346 are threaded onto the end portions 344 of the tube 342 to hold the tube in the barrier 302 and maintain the explosion-resistant characteristics of the barrier. The length of the tube 342 is greater than the thickness of the barrier 302 to assure that the threaded end portions 344 of the tube 342 are located outside of the barrier 302.

A light transmissive member 360 is located within a central opening 348 in the tube 342. The light transmissive member 360 is preferably a glass rod. An elastomeric O-ring 362 is located at each axial end of the light transmission member 360 and partially within the central opening 348 of the tube 342. The light transmissive member 360 closely fits within the central opening 348 in the tube 342.

A flame suppression path length L3 extends between the light transmissive member 360 and the central opening 348 of the tube 342. The fit between the light transmissive member 360 and the central opening 348 is tight so that either engagement or a very small clearance exists therebetween and flame propagation through the interface of the light transmissive member and the central opening is inhibited. The flame suppression path has a length L3 which extends for at least 1.5 inches and preferably 2.03 inches.

An externally threaded retention member 364 is located in each axial end of the tube 342 in threaded engagement with internally threaded portions 366 of the tube. Each retention member 364 is threaded axially into engagement against the O-ring 362. The retention members 364 and O-rings 362, thus, retain the light transmissive member 360 within the central opening 348 of the tube 342 and prevent any relative axial movement of the light transmissive member within the tube. The O-rings 362 act to accommodate, by compression or expansion, any difference in the rates of expansion or contraction of the light transmissive member 360 and the tube 342.

Each retention member 364 has an internally threaded end portion 382 and a chamber 384. A light transmitting coupler sphere 386 is located in the chamber 384 of the retention member 364. The spherical coupling member 386 is spaced apart slightly from the end of the light transmissive member 360. An elastomeric O-ring 388 is located between the spherical coupling member 386 and a shoulder 390 at an axial end of the chamber 384. The other axial end 392 of the chamber 384 is deformed over the spherical coupling member 386 to retain the coupling member within the chamber 384. The O-ring 388 accommodates differential rates of expansion or contraction of the coupling member 386 and attachment member 364.

The internally threaded end portion 382 receives a threaded connector 400 for attaching a fiber optic cable 402 to the signal transmitting device 320. The fiber optic cable 402 is located so its end 404 is adjacent the light transmissive spherical coupling member 386. The coupling member 386 transmits light between the fiber optic cable 402 and light transmissive member 360.

Thus, when a light signal is generated within the signal emitting device 322, the light is transmitted through the fiber optic cable 402 to the left spherical coupling member 386, as viewed in FIG. 11, to the light transmissive member 360, to the right spherical coupling member 386, to the right fiber optic cable 402 and then to the signal receiving device 324. The light signal has been transmitted through the barrier 302 without allowing a spark or flame to propagate between the opposite sides of the barrier 302.

Although the invention has been described with a certain degree of particularity, it should be understood that those skilled in the art can make various changes to it without departing from the spirit or scope as hereinafter claimed.

Having described at least one embodiment of the present invention, what is claimed is:

1. An apparatus for transmitting a signal through a barrier which at least partially defines an enclosed and explosion resistent room, said apparatus comprises:
    a body with an opening extending therethrough;
    attachment structure for fixing said body in an opening in said barrier and maintaining the explosion proof characteristics of the barrier;
    a light transmissive member closely fit in the opening of said body to inhibit flame propagation on one side of the barrier from reaching the other side of said barrier through a flame path clearance between said body and said light transmissive member; and
    retention structure for retaining said light transmissive member in the opening in said body and for connecting one of a pair of fiber optic members to a respective end of said body in light transmitting communication with an end of said light transmissive member.

2. The apparatus in claim 1 wherein said flame path clearance between said light transmissive member and said body extends for a length of at least 1.5 inches taken in a direction along the extent of said body.

3. The apparatus in claim 1 wherein said attachment structure includes an external thread formed on an end portion of said body and an internally threaded member for threaded engagement with said external thread on said body.

4. The apparatus in claim 1 wherein said retention structure includes an internal thread formed in an end portion of said body and an externally threaded lens stop member for threaded engagement with the internal thread in said body, said lens stop member further including an internally threaded portion for threaded connection with a threaded end member of said fiber optic member.

5. The apparatus in claim 1 wherein said light transmissive member is a glass rod.

6. The apparatus in claim 1 further including a light transmitting coupler sphere located between said light transmissive member and said fiber optic member to enable light communication between different sizes of said light transmissive member and said fiber optic member and wherein said coupling sphere is located in said retention structure.

7. The apparatus in claim 1 further including a first annular elastomeric member located between said coupling sphere and a shoulder of said retention structure and a second annular elastomeric member located between said retention structure and said light transmissive member.

8. An apparatus for transmitting a signal through a barrier of a sealed enclosure, said apparatus comprising:
    a body having a length greater than the thickness of the barrier and an opening extending therethrough;
    attachment structure for fixing said body in an opening extending through said barrier;
    a light transmissive member fit in the opening of said body to inhibit flame propagation between said body and said light transmissive member; and
    retention structure for retaining said light transmissive member in the opening in said body and for connecting one of a pair of fiber optic members to a respective end of said body in light transmitting communication with an end of said light transmissive member.

9. The apparatus in claim 8 wherein said attachment structure includes an external thread formed on an end portion of said body and an internally threaded member for threaded engagement with said external thread on said body.

10. The apparatus in claim 8 wherein said retention structure includes an internal thread formed in an end portion of said body and an externally threaded lens stop member for threaded engagement with the internal thread in said body, said lens stop member further including an internally threaded portion for threaded connection with a threaded end member of said fiber optic member.

11. The apparatus in claim 8 further including a light transmitting coupler sphere located between said light transmissive member and said fiber optic member to enable light communication between different sizes of said light transmissive member and said fiber optic member and wherein said coupling sphere is located in said retention structure.

* * * * *